United States Patent Office 3,312,693
Patented Apr. 4, 1967

3,312,693
HYDRAZINIUM XANTHATES AND METHOD FOR THEIR PREPARATION
Paul R. Steyermark, Silver Spring, Md., assignor to W. R. Grace & Co., New York, N.Y., a corporation of Connecticut
No Drawing. Filed July 16, 1964, Ser. No. 383,232
12 Claims. (Cl. 260—247.1)

The present application is a continuation-in-part of application S.N. 281,751, filed May 20, 1963, now abandoned.

The present invention relates to novel compositions of matter, and more specifically to novel and useful derivatives of hydraziniums.

It is known that a wide variety of hydraziniums having the general formula

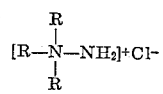

wherein R represents organic radicals, may be easily prepared by reacting tertiary amines with chloramine. The hydrazinium cation possesses ionic characteristics which enables it to conbine with numerous anions. By selecting proper anions, 1-hydrazinium salts may be prepared which possess novel and useful properties.

It is therefore an object of the present invention to provide a novel class of hydrazinium derivatives.

It is a further object to provide novel hydrazinium derivatives which possess useful properties.

These and still further objects of the present invention will become readily apparent to one skilled in the art from the following detailed description and specific examples.

Broadly, the novel hydrazinium derivatives contemplated herein may be described as hydrazinium xanthates possessing the following general structure

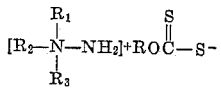

wherein R, $R_1$, $R_2$ and $R_3$ represent similar or different organic radicals.

More specifically, I have found that good yields of the above hydrazinuim xanthates may be obtained by first converting the desired hydrazinium halide to its corresponding hydroxide by reaction with sodium hydroxide, wet silver oxide or a hydroxyl bearing ion exchange resin, and secondly reacting the hydrazinium hydroxide with carbon disulfide in the presence of an alcohol. The reactions may be illustrated by the following equations:

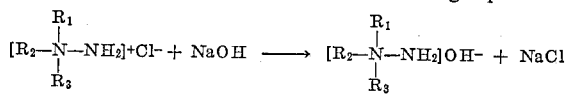

and

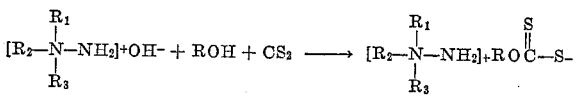

In the above formula R represents alkyl having 1 to 4 carbon atoms and $R_1$, $R_2$, and $R_3$ may represent any organic radical which may be found on any precusor tertiary amine which is used in the formation of the initial hydrazinium chloride and which is not attached by carbon disulfide. A complete and thorough discussion of the disclosure of the hydrazinium halides which may be used in the practice of the present invention is disclosed in Patent 2,955,108, to Omietanski.

Typical examples of $R_1$, $R_2$ and $R_3$ are: alkyl having 1 to 24 carbon atoms, alkenyl having 2 to 24 carbon atoms, cycloalkyl having up to 6 carbon atoms, phenyl, alkylphenyl wherein the alkyl substituent possesses 1 to 12 carbon atoms, hydroxyalkyl wherein the alkyl group possesses 2 to 12 carbon atoms, and hydroxypolyethoxyethyl wherein the radical possesses up to 25 ethoxy groups. Furthermore, $R_1$ and $R_2$ may be joined together to form a heterocyclic ring structure having at least 3 and not more than 8 members which may be atoms such as carbon and oxygen.

Specific examples of useful hydrazinium compounds are:

N,N-bis(perhydrotallow)-N-methylhydrazinium chloride
N,N-dimethyl-N-"soya" hydrazinium chloride
N,N-dimethyl-N-p-[(2,4,4-trimethyl)-2-pentyl]-phenoxyethoxyethyl-hydrazinium chloride
N,N-dimethyl-N-octadecylhydrazinium chloride
N,N-dimethyl-N-phenylhydrazinium chloride
N,N-dimethyl-N-(2-hydroxyethyl)-hydrazinium chloride
N,N-bis(hydroxyethyltetraethoxy)-N-octadecylhydrazinium chloride
N,N-bis(hydroxytetracosaethoxyethyl)-N-octadecylhydrazinium chloride
N-(hydroxyethylheptaethoxy)-N-(hydroxyethyl hexaethoxy)-N-"soya" hydrazinium chloride
N-amino-N-hydroxyethylmorpholinium chloride
N-amino-N-"tallow"morpholinium chloride
N,N-bis(coco)-1-methylhydrazinium chloride
N,N-dimethyl-N-hexadecylhydrazinium chloride
N,N-dimethyl-N-"Coco"hydrazinium chloride
N,N-dimethyl-NN-dodecylhydrazinium chloride
N,N-dimethyl-N-dodecylhydrazinium chloride
N,N-dimethyl-N-dodecylhydrazinium chloride
N-(hydroxyethoxyethyl)-N-(hydroxyethoxyethyl)-N-tallowhydrazinium chloride
N,N-diethyl-N-cyclohexylhydrazinium chloride
N,N-bis(soya)-N-methylhydrazinium chloride
N,N,N-trimethylhydrazinium chloride
N,N,N-trihexylhydrazinium chloride
N-amino-N-methylmorpholinium chloride
N,N-bis(2-hydroxyethyl)-N-octadecylhydrazinium chloride
N-methyl-N-benzyl-N-[2(p-t-octyl-phenoxyethoxy)-ethyl]-hydrazinium chloride
N,N,N-trihydroxyethylhydrazinium chloride
N,N,N-trihydropolyethoxyethylhydrazinium chloride.

The conversion of the hydrazinium halide to the corresponding hydroxide is preferably done by first preparing a suspension or solution of the hydrazinium salt in an inert solvent, preferably a lower alkanol, such as methanol, then adding an equivalent amount of an alcoholic inorganic base such as sodium hydroxide to the suspension or solution.

The neutralization of the hydrazinium halide and its conversion to the corresponding hydrazinium hydroxide is instantaneous at room temperature. Other solvents besides methanol which may be used are other lower aliphatic alcohols, including ethanol, propanol and butanol. Inorganic bases used in the present invention may be sodium hydroxide, potassium hydroxide, calcium hydroxide, sodium carbonate, calcium oxide, magnesium oxide, sodium ethoxide, and potassium methoxide. The hydroxide may also be formed by reaction with moist silver oxide, or hydroxyl bearing ion exchange resins.

Subsequent to conversion of the hydrazinium halide to the hydroxide the metalic halide salt formed during the conversion may be removed by filtration. The solution containing the hydroxide is then admixed with carbon disulfide. Preferably a slight excess of carbon disulfide required to form the desired dithiocarbamate is used. However, the amount is not critical and any amount will yield some of the desired product. The mixture is reacted at a temperature of from about −50 to about 50° C. whereby the xanthate forms almost immediately. Concentration of the reaction solution and/or cooling yields the desired hydrazinium xanthate which may be further recrystallized to give a product of the desired purity.

Having described the basic elements of the present invention, the following detailed specific examples are given to illustrate embodiments thereof.

*Example I*

A sample of N,N-dimethyl-N-hydrotallowhydrazinium chloride weighing 37 g. and containing 9.6% chloride ion and having a molecular weight of 370 was suspended in 100 ml. of methanol. To the suspension was added 280 ml. of 0.362 N methanolic sodium hydroxide. Then, 8.3 g. of carbon disulfide was added. The solution was stirred for 30 minutes and left overnight at room temperature. The next day the solution was concentrated at a reduced pressure to a small volume. Acetone was added to the residue, and the mixture was magnetically stirred for 1 hour. The precipitated sodium chloride was removed by filtration and subsequently dried. Sodium chloride weighed 5.4 g. which represented a 93% neutralization of the starting hydrazinium chloride. On cooling the original filtrate to −20° C. a crystalline material melting at 47–49° C. was recovered. It weighed 25.5 g. An additional amount of 7.2 g. was recovered by further concentration of the mother liquors. The overall yield was 80%. This material is assigned the following structure:

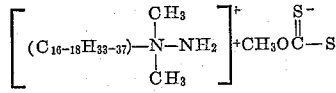

Analysis yielded the following results, assuming the hydrazinium chloride possessed a molecular weight of 370.

Calculated: N, 4.44; S, 10.16. Found: N, 5.18; S, 9.93.

*Example II*

11 g. (0.1 mole) of N,N,N-trimethylhydrazinium chloride dissolved in 70 ml. of methanol. 76 ml. of 1.31 N sodium hydroxide in methanol was added, followed by 8.8 g. (0.115 mole) of carbon disulfide. The yellow mixture was magnetically stirred at room temperature for thirty minutes and left overnight at room temperature. The solution was concentrated; the precipitated sodium chloride was filtered, and the filtrate was diluted with ether and acetone, and cooled several hours at Dry Ice temperature. The yellow precipitate was filtered and vacuum dried. It weighed 16.0 g. (88% yield) and melted at 48–49° C.

Analysis.—Calculated for.

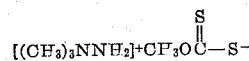

C, 32.94; H, 7.74; N, 15.37; S, 35.18. Found: C, 32.70; H, 7.74; N, 15.14; S, 35.20.

*Example III*

15.2 g. (0.1 mole) of N,N,N-triethylhydrazinium chloride gave on similar treatment with methanolic sodium hydroxide and carbon disulfide 18.5 g. (83% yield) of crystalline product melting at 65–66° C.

Analysis.—Calculated for

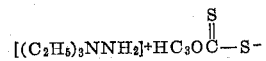

C, 42.82; H, 8.98; N, 12.49; S, 28.58. Found: C, 42.75; H, 9.98; N, 12.48; S, 28.61.

*Example IV*

4.62 g. (0.0195 mole) of N,N,N-tributylhydrazinium chloride gave in similar way 3.76 g. (63% yield) of the crystalline product melting at 37–38° C.

Analysis.—Calculated for

C, 54.49; H, 10.76. Found: C, 55.31; H, 10.46.

*Example V*

2.98 g. (0.0179 mole) of N-hydroxyethyl-N-aminomorpholinium chloride gave on treatment with methanolic sodium hydroxide and carbon disulfide two products which had identical melting points, but different crystalline forms and slightly different infrared spectra. These two products are considered to be steric isomers. All together there was recovered 2.58 g. (81% yield) of a crystalline product melting at 75–76° C.

Analysis.—Calculated for

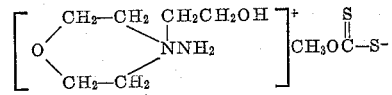

C, 37.77; H, 7.13; N, 11.09; S, 25.21. Found: C, 38.32; H, 7.13; N, 10.42; S, 25.30.

*Example VI*

1.80 g. (0.009 mole) of N-phenyl-N,N-diethylhydrazinium chloride gave on treatment with methanolic sodium hydroxide and carbon disulfide three products. One product, weighing 35 mg., was identified as crystalline sulfur. The other two products weighed 220 and 265 mg. and melted at 200–202° C. and 54–55° C. respectively. The lower melting material gave the following analysis: C, 50.73: H, 7.74; N, 10.77; S, 24.63.

Calculated for

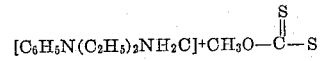

Found: C, 50.73; H, 7.74; N, 10.76; S, 24.63. The product was deliquescent.

*Example VII*

To a solution of 8.21 g. (0.0743 mole) of N,N,N-trimethylhydrazinium chloride in 40 ml. ethanol there was added 48.0 ml. of 1.545 ethanolic sodium hydroxide (0.0743 mole). The mixture was stirred magnetically, while 5.7 ml. (7.18 g., 0.0945 mole) of carbon disulfide was added. Stirring was continued for one hour, and the mixture was left overnight at room temperature. The usual workup gave 12.98 g. of product (89% yield). After two recrystallizations from ethanolether, the material melted at 47–48° C.

Analysis.—Calculated for

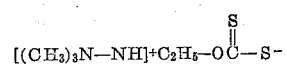

$C_6H_{16}N_2OS_2$: C, 36.70; H, 8.22; N, 14.27; S, 32.66. Found: C, 36.39; H, 8.31; N, 14.48; S, 33.02.

*Example VIII*

Following the general procedure outlined in Example VII 10.50 g. (0.069 mole) of N,N,N-triethylhydrazinium chloride dissolved in 30 ml. ethanol was treated with 44.6 ml. (0.069 mole) of ethanolic sodium hydroxide and a 25% excess of carbon disulfide. The product weighed 16.50 g. (86.3% yield) and melted at 30–31° C.

Analysis.—Calculated for

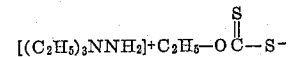

$C_9H_{22}N_2OS_2$: C, 45.34; M, 9.30; N, 11.75; S, 26.90. Found: C, 44.96; H, 9.21; N, 11.66; S, 27.30.

The hydrazinium xanthates obtained in the above specific examples find utility as rubber curing agents, insecticides, and plant fungicides. For example, the compound in Example I is effective as a fungicide against tomato early blight when applied as a hydrocarbon suspension.

I claim:
1. Compounds of the formula

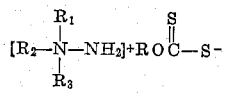

wherein R is lower alkyl, and $R_1$, $R_2$ and $R_3$ are selected from the group consisting of alkyl, alkenyl, cycloalkyl, phenyl, alkylphenyl, hydroxyalkyl, hydroxypolyethoxyethyl, and $R_1$ and $R_2$ combined to form a heterocyclic ring having 3 to 8 members selected from the group consisting of carbon and oxygen.

2. Compounds of the formula $$[R'(CH_3)_2N-NH_2]^+ CH_3OC(=S)-S^-$$

wherein R' represents alkyl having 16 to 18 carbon atoms.

3. The compound

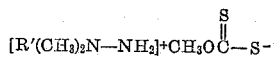

4. The compound

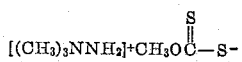

5. The compound

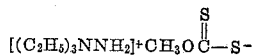

6. The compound

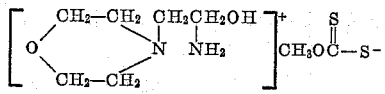

7. The compound

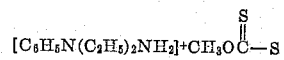

8. The compound

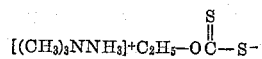

9. The compound

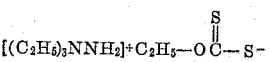

10. A method for preparing hydrazinium xanthates having the formula

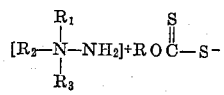

wherein R, $R_1$, $R_2$, and $R_3$ have the meaning of claim 1 which comprises reacting a compound of the formula

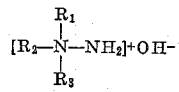

wherein $R_1$, $R_2$, and $R_3$ have the meaning set forth above, with carbon disulfide in the presence of a lower alkanol, and recovering the hydrazinium xanthate formed thereby.

11. The method of claim 10 wherein the reaction is carried out in the presence of methanol.

12. The method of claim 10 wherein the reaction is carried out at a temperature of from about −50 to about 50° C.

No references cited.

ALEX MAZEL, *Primary Examiner.*

JOSE TOVAR, *Assistant Examiner.*